US012772295B2

(12) United States Patent
Miao et al.

(10) Patent No.: US 12,772,295 B2
(45) Date of Patent: Oct. 20, 2026

(54) METHODS, COMPUTER READABLE MEDIUM AND DEVICES FOR COMMUNICATION INCLUDING CYCLIC PREFIX EXTENSION APPLIED SYMBOL BETWEEN TWO SIDELINK TRANSMISSIONS

(71) Applicant: NEC CORPORATION, Tokyo (JP)

(72) Inventors: Zhaobang Miao, Beijing (CN); Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 298 days.

(21) Appl. No.: 18/570,732

(22) PCT Filed: Jun. 21, 2021

(86) PCT No.: PCT/CN2021/101340

§ 371 (c)(1),
(2) Date: Dec. 15, 2023

(87) PCT Pub. No.: WO2022/266816

PCT Pub. Date: Dec. 29, 2022

(65) Prior Publication Data

US 2024/0284515 A1 Aug. 22, 2024

(51) Int. Cl.

*H04W 74/0833* (2024.01)
*H04L 27/26* (2006.01)
*H04W 92/18* (2009.01)

(52) U.S. Cl.

CPC ..... *H04W 74/0833* (2013.01); *H04L 27/2605* (2013.01); *H04W 92/18* (2013.01)

(58) Field of Classification Search

CPC . H04W 74/0833; H04W 92/18; H04W 72/40; H04W 74/0808; H04L 27/2605;
(Continued)

(56) References Cited

U.S. PATENT DOCUMENTS

2015/0264552 A1 9/2015 Xiong et al.
2016/0044666 A1 2/2016 Shin et al.
(Continued)

FOREIGN PATENT DOCUMENTS

CN 111954991 A 11/2020
CN 112425245 A 2/2021
(Continued)

OTHER PUBLICATIONS

"Physical layer structure for NR sidelink", Media Tek Inc., R1-1810453, 3GPP TSG RAN WG1 Meeting #94bis, Oct. 8-12, 2018, pp. 1-9, Chendu, China.
(Continued)

*Primary Examiner* — Marisol Figueroa
(74) *Attorney, Agent, or Firm* — Sughrue Mion, PLLC

(57) ABSTRACT

Embodiments of the present disclosure relate to communication. According to embodiments of the present disclosure, a first terminal device receives a configuration of a sidelink transmission from a network device. The configuration indicates a start symbol for the sidelink transmission. The first terminal device performs the clear channel assessment for the sidelink transmission. If the CCA is successful, the first terminal device transmits a sidelink signal based on a length between a completion of the CCA and the start symbol. In this way, it improves resource efficiency. It can also improve access ability.

8 Claims, 9 Drawing Sheets

(58) Field of Classification Search
CPC .. H04L 5/0007; H04L 5/0094; H04L 27/0006
See application file for complete search history.

(56) References Cited

U.S. PATENT DOCUMENTS

| | | | |
|---|---|---|---|
| 2020/0037358 A1 | 1/2020 | Chae et al. | |
| 2020/0267041 A1 | 8/2020 | Kim et al. | |
| 2020/0351669 A1 | 11/2020 | Xu et al. | |
| 2021/0119843 A1 | 4/2021 | Zhang et al. | |
| 2023/0146161 A1* | 5/2023 | Sun | H04L 27/2607 370/329 |
| 2023/0146718 A1* | 5/2023 | Lei | H04W 74/0808 370/329 |

FOREIGN PATENT DOCUMENTS

| | | | |
|---|---|---|---|
| CN | 112771956 A | 5/2021 | |
| EP | 4057665 A1 | 9/2022 | |
| JP | 2017-513415 A | 5/2017 | |
| JP | 2019-149594 A | 9/2019 | |
| WO | 2021/090440 A1 | 5/2021 | |
| WO | WO-2021217484 A1 * | 11/2021 | H04L 27/2607 |

OTHER PUBLICATIONS

International Search Report for PCT/CN2021/101340 dated Mar. 16, 2022 (PCT/ISA/210).
Written Opinion for PCT/CN2021/101340 dated Mar. 16, 2022 (PCT/ISA/237).
JP Office Action for JP Application No. 2023-578724, mailed on Mar. 25, 2025 with English Translation.
Extended European Search Report for EP Application No. 21946318.9, dated on Oct. 28, 2024.
Huawei et al., "Considerations on timing for D2D", 3GPP Draft; R1-135047, Nov. 1, 2013.

* cited by examiner

METHODS, COMPUTER READABLE MEDIUM AND DEVICES FOR COMMUNICATION INCLUDING CYCLIC PREFIX EXTENSION APPLIED SYMBOL BETWEEN TWO SIDELINK TRANSMISSIONS

CROSS REFERENCE TO RELATED APPLICATIONS

This application is a National Stage of International Application No. PCT/CN2021/101340 filed Jun. 21, 2021.

TECHNICAL FIELD

Embodiments of the present disclosure generally relate to the field of telecommunication, and in particular, to methods, devices for communication, and computer readable medium.

BACKGROUND

With development of communication technologies, different communication scenarios have been proposed. For example, sidelink communication has been proposed. Sidelink is the special kind of communication mechanism between device and device without going through a network device. The technology of "sidelink" can be applied to various scenarios, for example, vehicle-to-vehicle (V2V), vehicle-to-everything (V2X) and the like.

SUMMARY

In general, example embodiments of the present disclosure provide a solution for communication.

In a first aspect, there is provided a method for communication. The communication method comprises: receiving, at a first terminal device and from a network device, a configuration of a sidelink transmission, the configuration indicating a start symbol for the sidelink transmission; performing a clear channel assessment (CCA) for the sidelink transmission; and in accordance with a determination that the CCA is successful, transmitting, to a second terminal device, a sidelink signal comprising a cyclic prefix extension of a first symbol after the start symbol.

In a second aspect, there is provided a method for communication. The communication method comprises: transmitting, to the second terminal device, a signal within a guard symbol in a sidelink transmission on a shared spectrum.

In a third aspect, there is provided a terminal device. The terminal device comprises a processing unit; and a memory coupled to the processing unit and storing instructions thereon, the instructions, when executed by the processing unit, causing the first terminal device to perform acts comprising: receiving, at a first terminal device and from a network device, a configuration of a sidelink transmission, the configuration indicating a start symbol for the sidelink transmission; performing a clear channel assessment (CCA) for the sidelink transmission; and in accordance with a determination that the CCA is successful, transmitting, to a second terminal device, a sidelink signal comprising a cyclic prefix extension of a first symbol after the start symbol.

In a fourth aspect, there is provided a terminal device. The terminal device comprises a processing unit; and a memory coupled to the processing unit and storing instructions thereon, the instructions, when executed by the processing unit, causing the second terminal device to perform acts comprising: transmitting, to the second terminal device, a signal within a guard symbol in a sidelink transmission on a shared spectrum.

In a fifth aspect, there is provided a computer readable medium having instructions stored thereon, the instructions, when executed on at least one processor, causing the at least one processor to carry out the method according to the first or second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
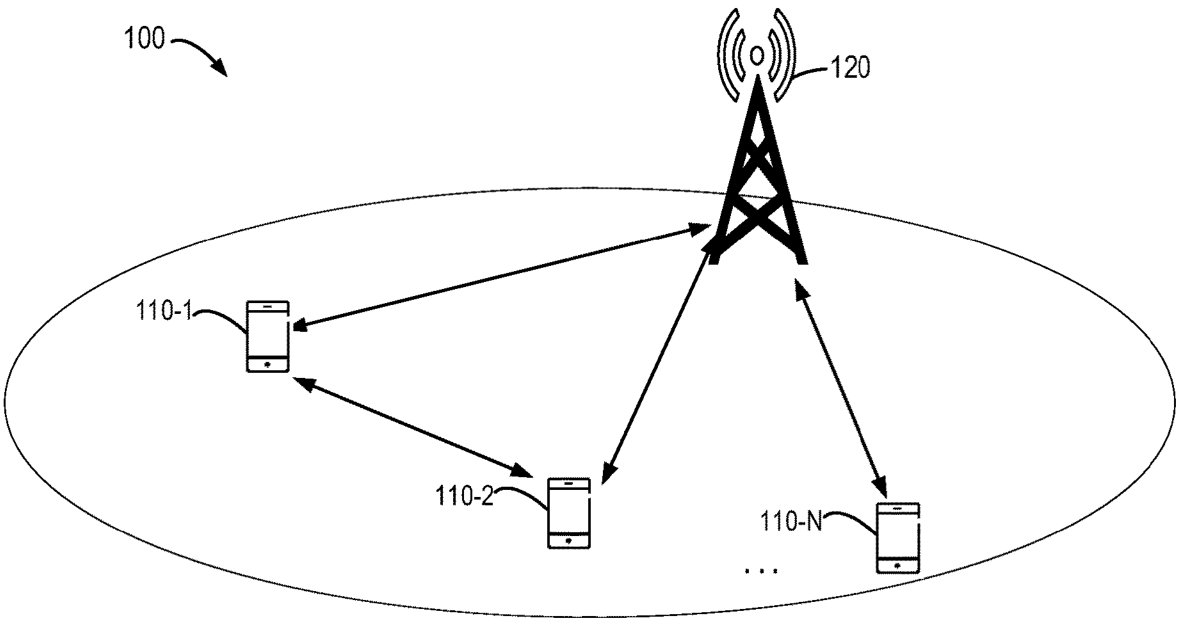
FIG. 1 is a schematic diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.95G, the third generation (3G), the fourth generation (4G), 4.5G, the fifth generation (5G) and 5G advanced, the six generation (6G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As mentioned above, sidelink communication has been proposed. In sub-7 GHz unlicensed bands, the NR coexistence with other systems is ensured via a listen-before-talk (LBT) channel access mechanism. Where, a UE intending to perform a sidelink transmission needs first to successfully complete an LBT check, before being able to initiate that same transmission. For a UE to pass an LBT check then it must observe the channel as available for a number of consecutive Clear Channel Assessment (CCA) slots. In sub-7 GHZ the duration of these slots is 9 μs. The UE deems the channel as available in a CCA slot if the measured power (i.e. the collected energy during the CCA slot) is below a regulatory specified threshold (which can depend on the operating band and geographical region). The term "listen-before-talk (LBT)" used herein refers to a technique used in radio communications whereby a radio transmitter first sense its radio environment before it starts a transmission. LBT can be used by a radio device to find a network the device is allowed to operate on or to find a free radio channel to operate on.

When a UE initiates the communication (i.e. the UE takes the role of initiating device), then this UE has to acquire the "right" to access the channel for a certain period of time-denoted in the regulations as the Channel Occupancy Time (COT) (for example, the duration 120 shown in FIG. 1)—by applying an "extended" LBT procedure where the channel must be deemed as free for the entire duration of a Contention Window (CW) (shown as the duration 110 in FIG. 1). This "extended" LBT procedure, is commonly known as LBT Category 4 (LBT Cat. 4). The term "sidelink" refers to a slink between two terminal devices, which enables device-to-device communications. The term "TX UE" used herein can refer to a UE which can transmit data to another UE when performing sidelink communications with the other UE. The term "receiving (RX) UE" used herein can refer to a UE which can receive data from another UE when performing sidelink communications with the other UE.

According to conventional technologies, resource elements used for the physical sidelink shared channel (PSSCH) in a first Orthogonal Frequency Division Multiplexing (OFDM) which includes any demodulation reference signal (DMRS), phase tracking reference signal (PTRS), or channel state information reference signal (CSI-RS) occurring in the first OFDM symbol, shall be duplicated in the OFDM symbol immediately preceding the first OFDM symbol. Further, the resource elements used for physical sidelink control channel (PSCCH) in the first OFDM symbol which includes any DMRS, PTRS, or CSI-RS occurring in the first OFDM symbol, shall be duplicated in the immediately preceding OFDM symbol. Moreover, the UE shall not transmit PSSCH in symbols which are not configured for sidelink. A symbol is configured for sidelink, according to higher layer parameters startSLsymbols and lengthSLsymbols, where startSLsymbols is the symbol index of the first symbol of lengthSLsymbols consecutive symbols configured for sidelink. Within the slot, PSSCH resource allocation starts at symbol startSLsymbols+1.

For a cyclic prefix (CP) extension (CPE) prior to at least a dynamically scheduled physical uplink shared channel (PUSCH) transmission, the CP extension is located in the symbol(s) immediately preceding the PUSCH allocation indicated by start and length indicator value (SLIV). The term "cyclic prefix (CP)" used herein refers to the prefixing of a symbol, with a repetition of the end. The supported durations for CP extension at the UE are: 0 (i.e. no CP extension); C1*symbol length (for example, 25 μs); C2*symbol length (for example, 16 μs-timing advance (TA)); C3*symbol length (for example, 25 μs-TA). For 15 and 30 kHz subcarrier spacing (SCS), C1 can be 1. And for 60 KHz SCS, C1 can be 2. It still remains some issues to be addressed, for example, whether C2/C3 is fixed or implicitly derived based on TA for each subcarrier spacing; whether the limit as per the previous agreement bounding the resulting CP extension to be less than or equal to one symbol for the given subcarrier spacing should be relaxed; applicability of this to other UL transmissions; whether the number of durations for CP extension that the UE can be signalled dynamically can be configured.

Further, it is not clear where the start of a sidelink transmission is after LBT success. If the symbol where LBT succeeds is not the indicated start symbol, the symbol length may not be satisfied. For example, the LBT may succeed at a later position of the physical slot or the LBT may succeed before the indicated start symbol. Moreover, it needs to be studied how to design CPE before sidelink transmissions considering the automatic gain control (AGC) symbol.

According to embodiments of the present disclosure, a first terminal device receives a configuration of a sidelink transmission from a network device. The configuration indicates a start symbol for the sidelink transmission. The first terminal device performs the CCA for the sidelink transmission. If the CCA is successful, the first terminal device transmits a sidelink signal based on a length between a completion of the CCA and the start symbol. In this way, it improves resource efficiency. It can also improve access ability.

FIG. 1 illustrates a schematic diagram of a communication system in which embodiments of the present disclosure can be implemented. The communication system 100, which is a part of a communication network, comprises a terminal device 110-1, a terminal device 110-2, . . . , a terminal device 110-N, which can be collectively referred to as "terminal device(s) 110." The number N can be any suitable integer number. The terminal devices can be communicated with each other via sidelinks.

The communication system 100 further comprises a network device 120. The numbers of terminal devices and network devices shown in FIG. 1 are given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G), the fifth generation (5G) and 5G advanced, the six generation (6G) and on the like, wireless local network communication protocols such as Institute for Electrical and Electronics Engineers (IEEE) 902.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
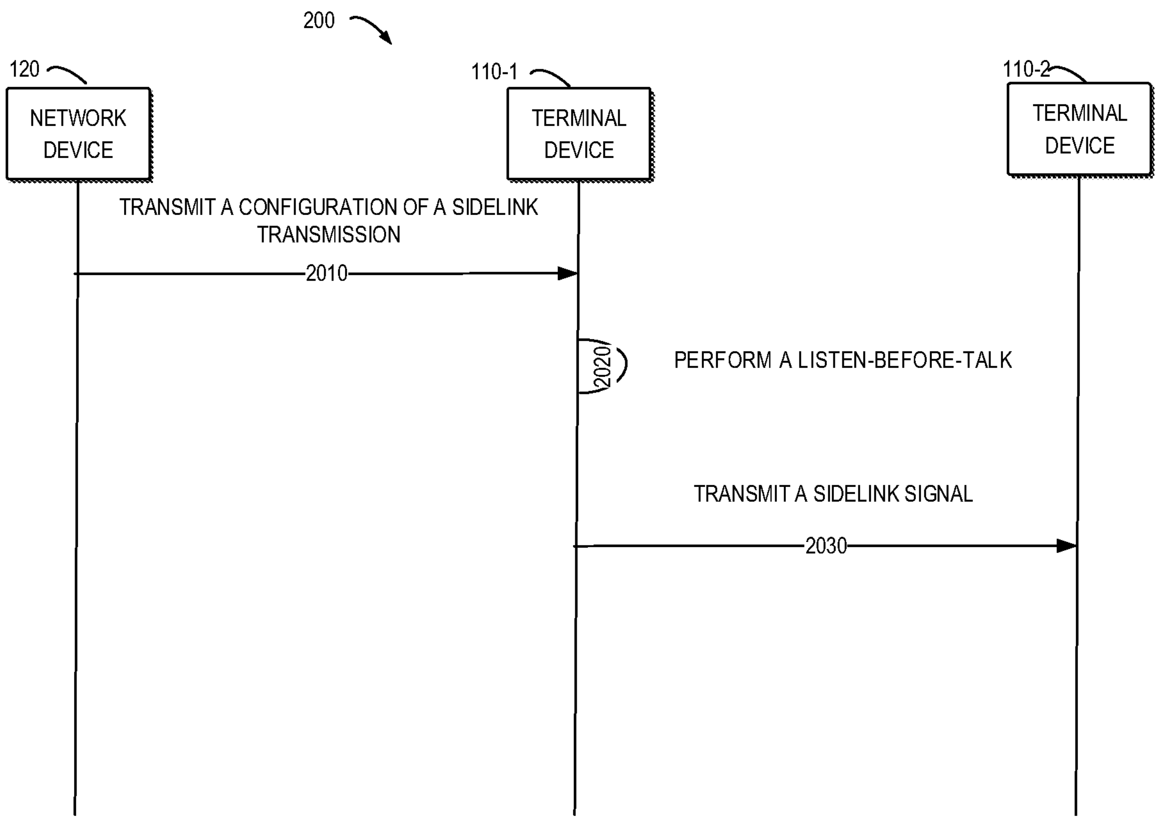
FIG. 2 illustrates a signaling flow for sidelink transmissions according to some embodiments of the present disclosure.

Embodiments of the present disclosure will be described in detail below. Reference is first made to FIG. 2, which shows a signaling chart illustrating process 200 among network devices according to some example embodiments of the present disclosure. Only for the purpose of discussion, the process 200 will be described with reference to FIG. 1. The process 200 may involve the terminal device 110-1, the terminal device 110-2 and the network device 120 (or high layer of terminal device 110-1) in FIG. 1. Only for the purpose of illustrations, the terminal device 110-1 may be referred to as the first terminal device, the terminal device 110-2 may be referred to as the second terminal device.

The network device 120 transmits 2010 a configuration of a sidelink transmission to the terminal device 110-1. The configuration of the sidelink transmission indicates one or more start symbols for the sidelink transmission. In addition, the configuration may also indicate a length of a slot for the sidelink transmission. Alternatively or in addition, the configuration can also indicate a set of resources for the sidelink transmission.

The terminal device 110-1 performs 2020 the CCA for the sidelink transmission. For example, the terminal device 110-1 may measure energy on a sidelink band/channel. If the measured energy is lower than threshold energy, the CCA is successful. It should be noted that the terminal device 110-1 can perform any suitable types of the CCA. Alternatively or in addition, the terminal device 110-1 may perform the LBT on the sidelink band. It should be noted that the terminal device 110-1 can perform any proper operations to determine whether the sidelink band/channel is occupied. In some embodiments, if the completion of the CCA is within a set of symbols in one slot, the terminal device 110-1 can perform the CCA.

The terminal device 110-1 transmits 2030 a sidelink signal to the network device 120 based on a completion of the CCA and the start symbol, if the CCA is successful. Details of the transmission of the sidelink signal are described with the reference to FIGS. 3-8.

In some embodiments, if the completion of the CCA is within the start symbol and remaining time in the start symbol is longer than a predetermined threshold, the terminal device 110-1 may transmit the sidelink signal after the completion of the CCA. The sidelink signal may comprise a portion of a first symbol which is after the start symbol. For example, the sidelink signal may comprise a cyclic prefix extension of the first symbol. In some embodiments, the first symbol can be a symbol containing PSCCH. It should be noted that the first symbol can be any suitable symbols. In this case, the sidelink signal does not comprise an AGC symbol. In other words, the legacy AGC symbol is omitted in the sidelink signal. In this way, it improves resource efficiencies and access ability. The term "automatic gain control (AGC) symbol" used herein can refer to a symbol which comprises a duplication of the first symbol after the start symbol. The AGC symbol can comprise any suitable type of symbols which can be used to maintain a suitable signal amplitude.

Figure 3:
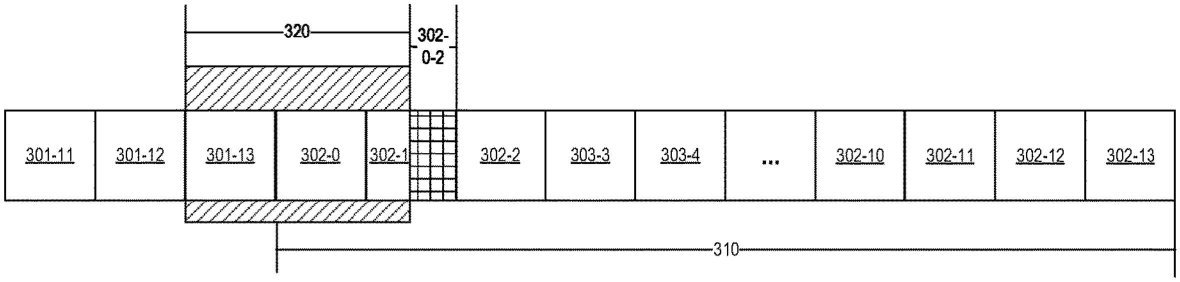
FIG. 3 illustrates a simplified block diagram of sidelink slots to some embodiments of the present disclosure.

FIG. 3 illustrates a simplified block diagram of sidelink slots to some embodiments of the present disclosure. As shown in FIG. 3, the sidelink slot 310 may comprise the symbol 302-1, 302-2, 302-3, 302-4, . . . , 302-10, 302-11, 302-12 and 302-13. Only for the purpose of illustrations, the sidelink slot 310 may comprise 14 symbols. It should be noted that the sidelink slot 310 can comprise any suitable number of symbols. The configuration (for example, received at 2010) may indicate that the start symbol is the symbol 302-1. The symbols 301-11, 301-12, and 301-13 may be included in the preceding sidelink slot which is before the sidelink slot 310. It should be noted that a number of symbols in the preceding sidelink slot are omitted.

As shown in FIG. 3, the CCA procedure 320 can start from the symbol 301-13 and complete within the symbol 302-1. In other words, in this case, the CCA succeeds in symbol #n and the start symbol (represented as "SL-StartSymbol") is symbol #n, which can be represented as mod (SL-StartSymbol–#n, L_symbol)=0. If the remaining time 302-0-2 in the symbol 302-0 is longer than a predetermined threshold, the terminal device can transmit the sidelink signal which comprises a portion of the symbol 302-2 which is the first symbol after the symbol 302-1. The portion of the symbol 302-2 can be a cyclic prefix extension of the first symbol. In some embodiments, the predetermined threshold can be a minimized required AGC timing for each SCS. It should be noted that the predetermined threshold can be any suitable values. If the remaining time 302-0-2 is less than the predetermined threshold, the terminal device 110-1 can determine that the CCA is failed. In this case, symbol duplication before the first symbol #(n+1) (i.e., the symbol 302-2) containing PSCCH in legacy SL is not performed.

The symbol 302-2 can comprise PSCCH. For example, the signal in the symbol 302-1 could be part of the symbol 302-2 containing PSCCH, which can be represented as:

$$\bar{s}_l^{(p,\mu)}(t) = \sum_{k=0}^{N_{grid,x}^{size,\mu} N_{sc}^{RB}-1} a_{k,l}^{(p,\mu)} e^{j2\pi\left(k+k_0^{\mu}-N_{grid,x}^{size,\mu} N_{sc}^{RB}/2\right)\Delta f\left(y-N_{CP,l}^{\mu} T_c-t_{start,l}^{\mu}\right)}, \quad (1)$$

where t1-t_Δ<=t<t1, t1=the start timing of symbol (SL-StartSymbol+1), t_Δ=length of Res/AGC signal.

In other embodiments, if the length between the completion of the CCA and the start symbol is one symbol, the terminal device 110-1 can transmit the sidelink signal after the completion of the CCA. The sidelink signal can comprise a cyclic prefix extension of an AGC symbol.

Figure 4:
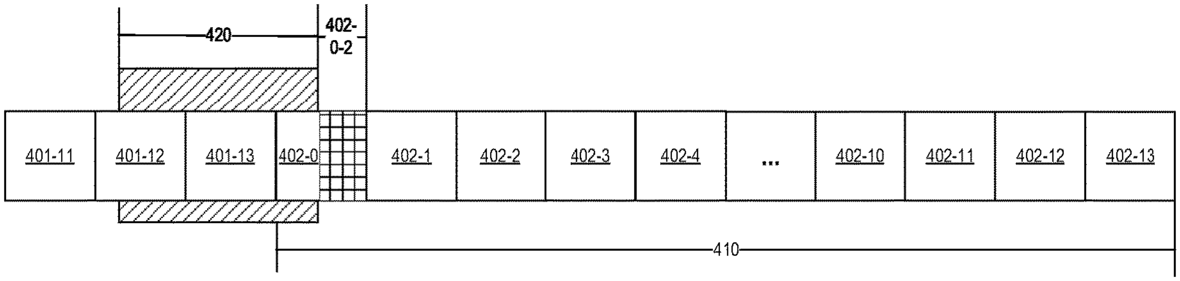
FIG. 4 illustrates a simplified block diagram of sidelink slots according to some embodiments of the present disclosure.

FIG. 4 illustrates a simplified block diagram of sidelink slots to some embodiments of the present disclosure. As shown in FIG. 4, the sidelink slot 410 may comprise the symbol 402-1, 402-2, 402-3, 402-4, . . . , 402-10, 402-11, 402-12 and 402-13. Only for the purpose of illustrations, the sidelink slot 410 may comprise 14 symbols. It should be noted that the sidelink slot 410 can comprise any suitable number of symbols. The configuration (for example, received at 2010) may indicate that the start symbol is the symbol 402-1. The symbols 401-11, 401-12, and 401-13 may be included in the preceding sidelink slot which is before the sidelink slot 410. It should be noted that a number of symbols in the preceding sidelink slot are omitted.

As shown in FIG. 4, the CCA procedure 420 can start within the symbol 401-12 and complete within the symbol 402-0. In other words, in this case, the CCA succeeds in symbol #n, it means that the CCA succeeds at one symbol before the start symbol, which can be represented as mod (SL-StartSymbol–#n, L_symbol)=1. The terminal device can transmit the sidelink signal which comprises a cyclic prefix extension of the symbol 402-1 in the duration 402-0-2. The symbol 402-1 can be an AGC symbol. In this way, it improves access ability.

Alternatively or in addition, if the length between the completion of the CCA and the start symbol exceeds a predetermined number of symbols, the terminal device 110-1 may transmit the sidelink signal after the completion of the CCA. The sidelink signal may comprise a cyclic prefix extension of an automatic gain control symbol and a duplication of the automatic gain control symbol. The predetermined number can be any suitable numbers.

Figure 5A:
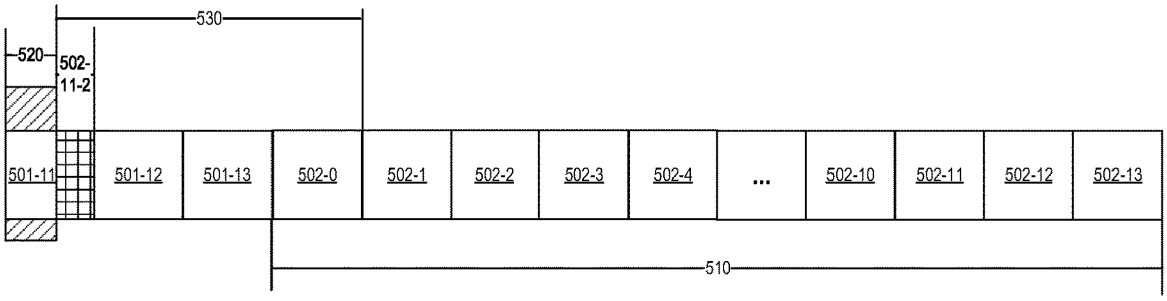
FIGS. 5A and 5B illustrate a simplified block diagram of sidelink slots according to other embodiments of the present disclosure, respectively.

FIG. 5A illustrates a simplified block diagram of sidelink slots to some embodiments of the present disclosure. As shown in FIG. 5A, the sidelink slot 510 may comprise the symbol 502-1, 502-2, 502-3, 502-4, . . . , 502-10, 502-11, 502-12 and 502-13. Only for the purpose of illustrations, the sidelink slot 510 may comprise 14 symbols. It should be noted that the sidelink slot 510 can comprise any suitable number of symbols. The configuration (for example, received at 2010) may indicate that the start symbol is the symbol 502-1. The symbols 501-11, 501-12, and 501-13 may be included in the preceding sidelink slot which is before the sidelink slot 510. It should be noted that a number of symbols in the preceding sidelink slot are omitted.

As shown in FIG. 5A, the CCA procedure 520 can complete within the symbol 501-11. The terminal device 110-1 can transmit the sidelink signal 530 which comprises the cyclic prefix extension (501-11-2) of the AGC symbol 502-1 and the symbols 501-12 and 501-13. For example, if CCA succeeds in symbol #n, for the case where mod(SL-StartSymbol–#n, L_symbol) is bigger than 1, i.e., CCA succeeds at one more symbols before the SL-StartSymbol, the reservation signal could be: (1) for symbol #n+1, n+2, . . . . SL-StartSymbol-1, duplication of the first symbol containing PSCCH, i.e., legacy AGC symbol duplication; (2) for symbol #n, CPE of the next AGC symbol.

If CCA succeeds in symbol #n while mod(SL-StartSymbol–#n, L_symbol) is not 1 where L_symbol=14 (symbol length in a slot) i.e., CCA success symbol is not the immediately preceding symbol of SL-StartSymbol.

Figure 5B:
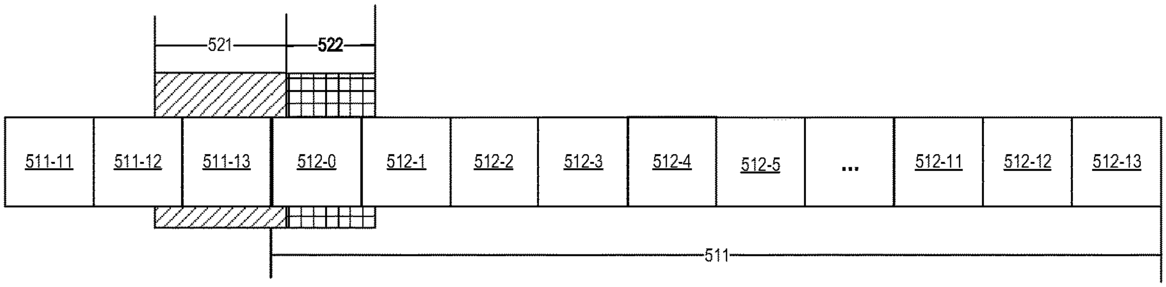

Alternatively, the TA offset may be considered after CCA success. In other words, the CCA succeeds in symbol #n while mod(SL-StartSymbol-(#n+TA), L_symbol) does not equal to 1, i.e., symbol (CCA success time+TA) is not the previous symbol of SL-StartSymbol. FIG. 5B illustrates a simplified block diagram of sidelink slots to some embodiments of the present disclosure. As shown in FIG. 5B, the sidelink slot 511 may comprise the symbol 512-1, 512-2, 512-3, 512-4, 512-5, . . . , 512-10, 512-11, 512-12 and 512-13. Only for the purpose of illustrations, the sidelink slot 511 may comprise 14 symbols. It should be noted that the sidelink slot 511 can comprise any suitable number of symbols. The configuration (for example, received at 2010) may indicate that the start symbol is the symbol 512-5. The symbols 511-11, 511-12, and 511-13 may be included in the preceding sidelink slot which is before the sidelink slot 511. It should be noted that a number of symbols in the preceding sidelink slot are omitted. As shown in FIG. 5*b*, the CCA procedure 521 can complete AT the symbol 512-0. The terminal device 110-1 can transmit the sidelink signal after the CCA procedure 521 and the timing advance 522.

As an example embodiment, the terminal device 110-1 may transmit the sidelink signal if at least one of conditions is satisfied. In some embodiments, the conditions may comprise one or more of: the length is smaller than a threshold length; a priority of a traffic for the sidelink transmission is higher than a predetermined priority; the type of CCA is a predetermined CCA type, or an accumulating symbol counter is higher than a threshold number. For example, the condition may be mod(SL-StartSymbol−#n, L_symbol)<=LengthReservation by higher layer (pre-)configuration. Alternatively or in addition, the condition may be the priority value of the traffic is below an higher layer (pre-)configured PriorityReservation. In other embodiments, the condition may comprise that it's configured with allowed CCA type which is configured according the priority value of the traffic. Additionally, the condition may be that the remaining SymbolCounter>a (pre-)configured threshold where SymbolCounter is an accumulated number of skipped symbols. The symbol counter can be set to 0 after accessing the sidelink band. If none of the above conditions is satisfied, the terminal device 110-1 can determine that the CCA is failed.

Figure 6:
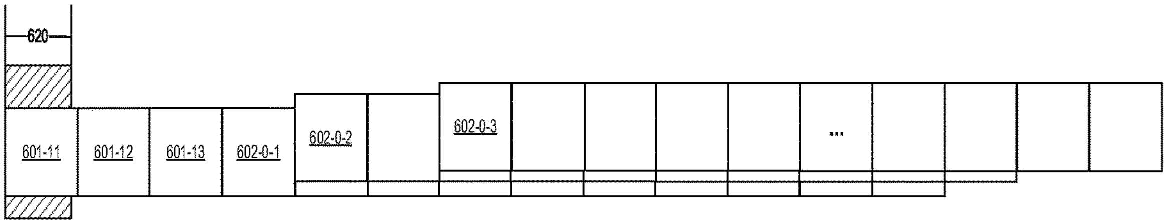
FIG. 6 illustrates a simplified block diagram of sidelink slots according to some embodiments of the present disclosure.

In some embodiments, the configuration may comprises a plurality of candidate start symbols for the sidelink transmission. For example, as shown in FIG. 6, the candidate start symbols can comprise the symbol 602-0-1, the symbol 602-0-2 and the symbol 602-0-3. The symbols 601-11, 601-12 and 601-13 are comprised in the preceding slot. It should be noted that a number of symbols in the preceding sidelink slot are omitted. The CCA procedure can be completed at the symbol 601-11. Only as an example, SL-StartSymbol could indicate multiple (e.g., one/two/three) values among {sym0 . . . sym7} as the valid start symbol(s) for sidelink transmission. e.g., sym 0, sym 1, sym2 or sym 0, sym 3/4, sym 7 for three case; 0,7 for two case. The SL-lengthSymbol should be respected by defer the end symbol.

In some embodiments, for a resource pool configured with multiple slots scheduling, not every slot contains AGC symbol before the start of sidelink transmission. For example, only one AGC symbols may be defined with a configured time window. The AGC symbol may be placed in the first symbol in the beginning slot or the end slot within the time window. In some embodiments, the time window can be configured via radio resource control (RRC) signaling. Alternatively, the time window can comprise multiple scheduled slots.

Figure 7:
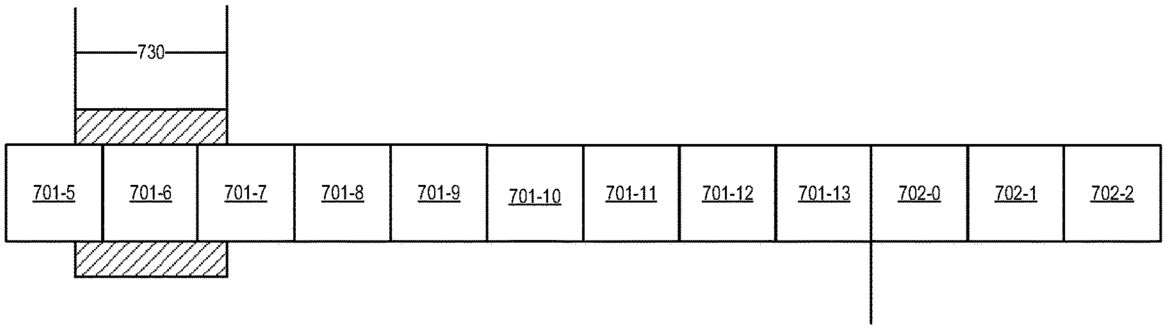
FIG. 7 illustrates a simplified block diagram of sidelink slots according to some embodiments of the present disclosure.

In some embodiments, if the completion of the CCA is within a set of symbols in one slot, the terminal device 110-1 can perform the CCA. In other words, if the completion of the CCA is within other symbols in the slot, the terminal device 110-1 may not perform the CCA. For example, the terminal device 110-1 shall not perform CCA that expected to be ended in symbol #7 to symbol #End CCA. Symbol #End CCA could be high layer configured, e.g., symbol #12,11,10 . . . 8. Or, in other words, the terminal device 110-1 can perform the CCA that is expected to be ended in other symbols. In this way, it can save power and reduce resource waste. FIG. 7 shows an example schematic diagram of sidelink slots. The symbols 701-5, 701-6, 701-7, 701-8, 701-9, 701-10, 701-11, 701-12 and 701-13 can be included in one slot and the symbols 702-0, 702-1 and 702-2 can be included in another slot. As shown in FIG. 7, the CCA procedure 730 will be completed at the symbol 701-7, the terminal device 110-1 may not perform the CCA. In some embodiments, if the CCA is to be completed in any one from the symbols 701-7, 701-8, 701-9, 701-10, 701-11, 701-12 and 701-13, the terminal device 110-1 may not perform such CCA.

Figure 8A:
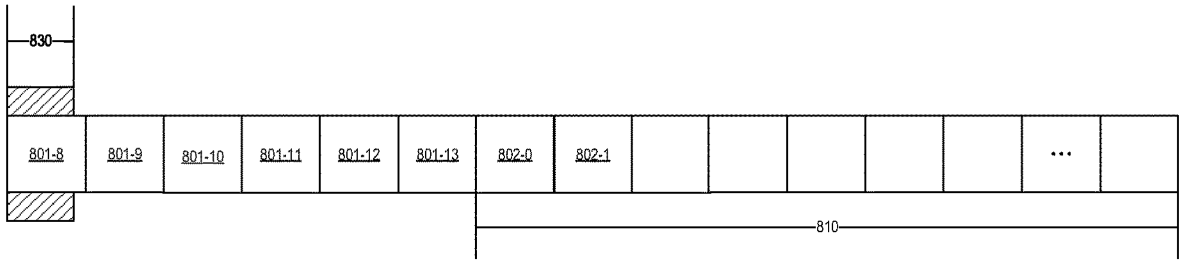
FIGS. 8A and 8B illustrate a simplified block diagram of sidelink slots according to some embodiments of the present disclosure, respectively.
Figure 8B:
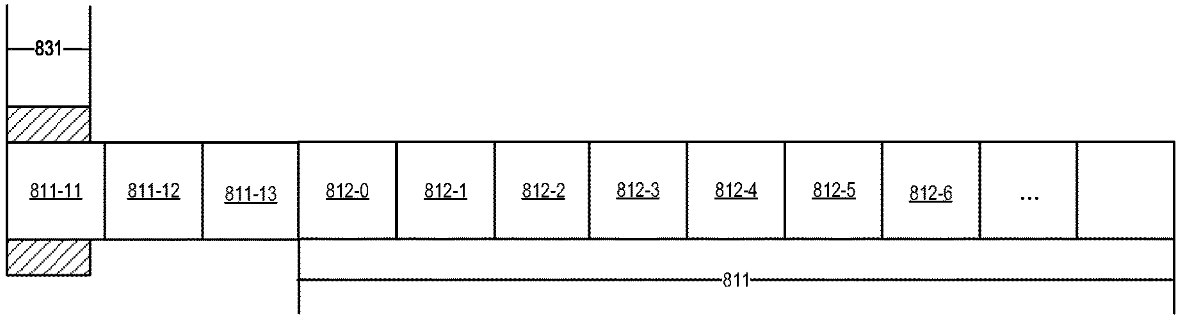

In some embodiments, the sidelink slot can cross the slot boundary. For example, as shown in FIG. 8A, the LTB procedure 830 is completed at the symbol 801-8. The symbols 801-9, 801-10, 801-11, 801-12, 801-13, 802-0 and 802-1 can be comprised in one sidelink slot. It should be noted that the sidelink slot can comprise other symbols. Since the symbols 802-0 and 802-1 can be included in the slot 810, the sidelink slot cross the slot boundary of the slot 810. Alternatively, as shown in FIG. 8B, the LTB procedure 831 is completed at the symbol 811-11. The symbols 801-12, 801-13, 802-0, 802-1 802-0, 802-1, 802-2, 802-3, 802-4, 802-5, and 802-6 can be comprised in one sidelink slot. It should be noted that the sidelink slot can comprise other symbols. Since the symbols 802-0, 802-1 802-0, 802-1, 802-2, 802-3, 802-4, 802-5, and 802-6 can be included in the slot 811, the sidelink slot cross the slot boundary of the slot 810.

Figure 9:
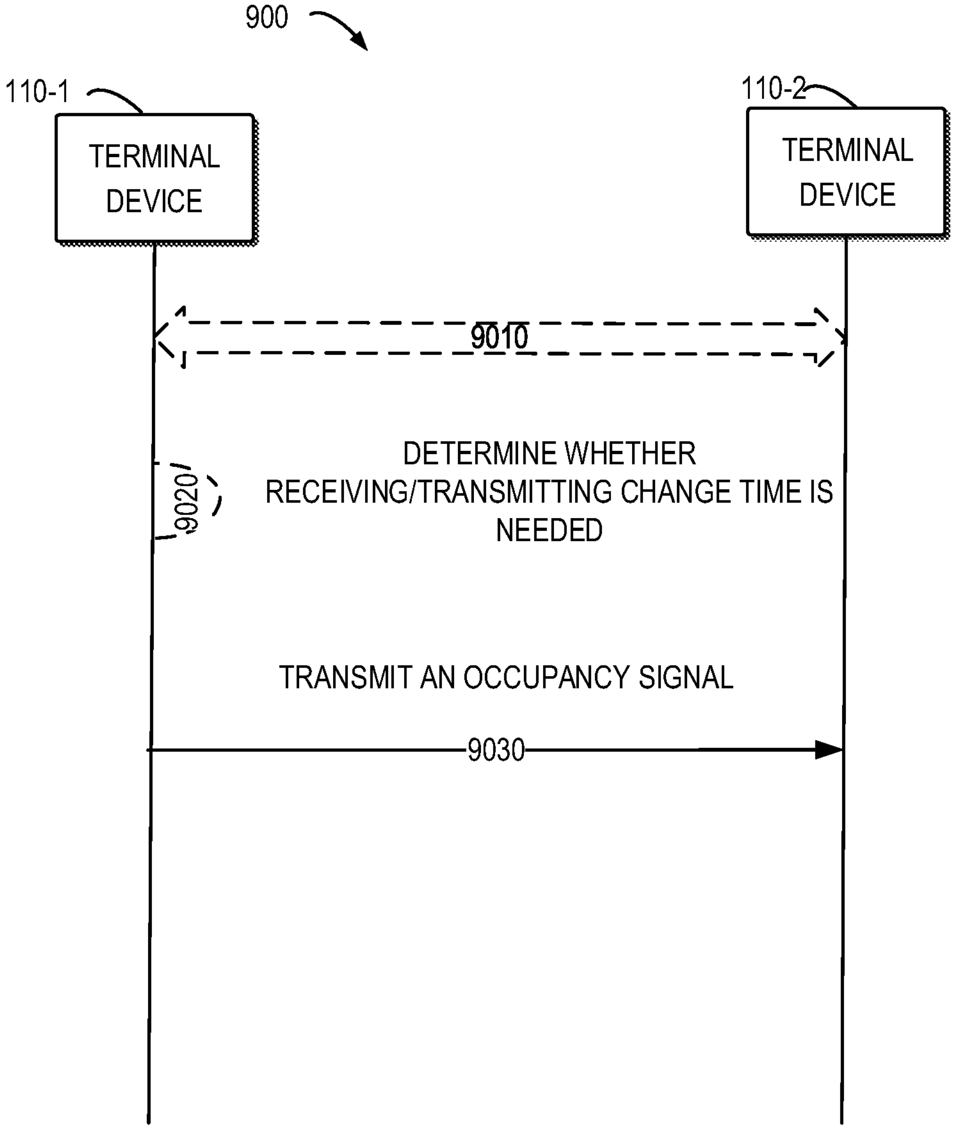
FIG. 9 illustrates a signaling flow for sidelink transmissions according to some embodiments of the present disclosure.

Embodiments of the present disclosure will be described in detail below. Reference is first made to FIG. 9, which shows a signaling chart illustrating process 900 among network devices according to some example embodiments of the present disclosure. Only for the purpose of discussion, the process 900 will be described with reference to FIG. 1. The process 900 may involve the terminal device 110-1 and the terminal device 110-2 in FIG. 1. Only for the purpose of illustrations, the terminal device 110-1 may be referred to as the first terminal device, the terminal device 110-2 may be referred to as the second terminal device. The process 900 is described with the reference to FIG. 10.

Figure 10:
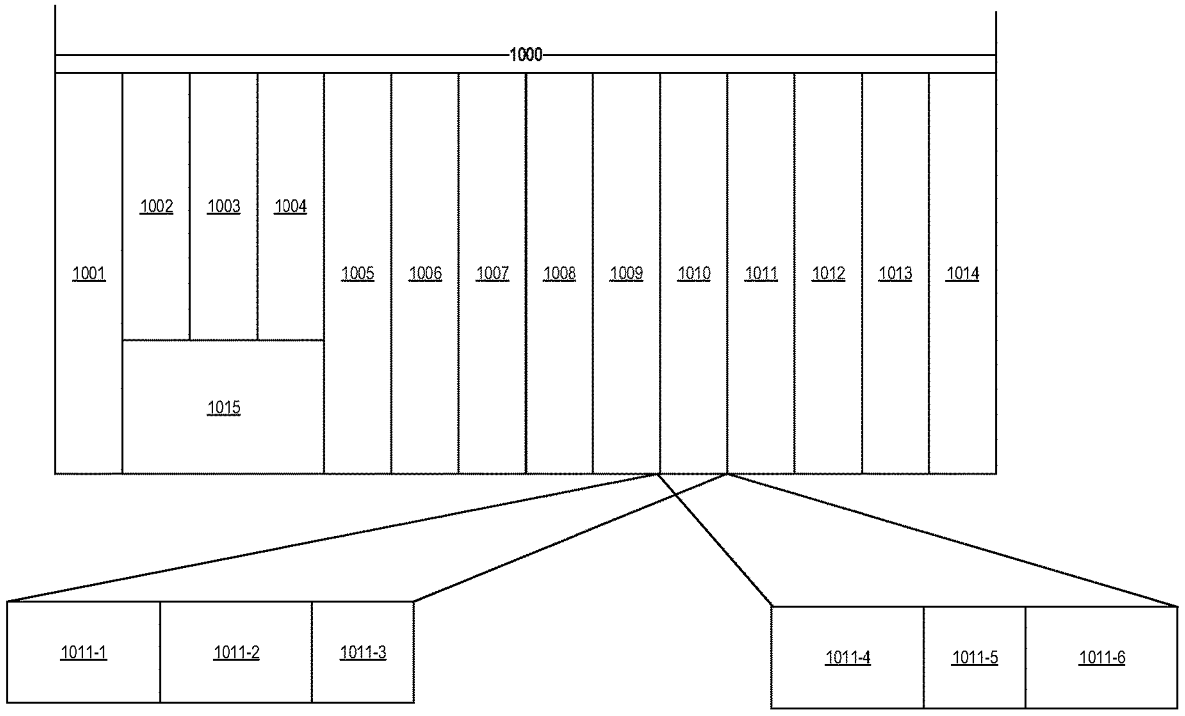
FIG. 10 illustrates a simplified block diagram of sidelink slots according to some embodiments of the present disclosure.

The terminal device 110-1 can perform 9010 a sidelink communication with the terminal device 110-2. As shown in FIG. 10, the sidelink slot 1000 can comprise a symbol 1001 containing AGC, a symbol 1002 containing DMRS, a symbol 1003 containing PSSCH, a symbol 1004 containing PSSCH, a symbol 1005 containing DMRS, a symbol 1006 containing PSSCH, a symbol 1007 containing PSSCH, a symbol 1008 containing DMRS, a symbol 1009 containing PSSCH, a symbol 1010 containing PSSCH, a guard symbol 1011, a symbol 1012 containing AGC/physical sidelink feedback channel (PSFCH), a symbol 1013 containing PSFCH and a guard symbol 1014. The PSCCH 1015 can be transmitted on the symbols 1002, 1003 and 1004. The terms "a symbol containing AGC" and "an AGC symbol" used herein are interchangeable. Similarly, the terms "a symbol containing DMRS" and "a DMRS symbol" used herein are interchangeable, the terms "a symbol containing PSSCH" and "a PSSCH symbol" used herein are interchangeable, and terms "a symbol containing PSFCH" and "a PSFCH symbol" used herein are interchangeable.

The terminal device 110-1 can determine 9020 whether receiving/transmitting change time is needed based on the sidelink communication. In some embodiments, terminal device 110-1 can perform the transmission in the PSSCH symbol before the guard symbol while does not perform reception in PSFCH after the guard symbol. For example, the terminal device 110-1 may perform the transmission in the PSSCH symbol 1010 and may not perform the reception in the PSFCH symbols 1012 and 1013 after the guard symbol 1011. Alternatively, the terminal device 110-1 may perform the transmission in the PSSCH symbol 1010 and the transmission in the PSFCH symbols 1012 and 1013 after the guard symbol 1011. In the above cases, the terminal device 110-1 can determine that the receiving/transmitting change time is not needed. The terminal device 110-1 may further transmit something in the guard symbol 1011 (for example, DMRS, PSFCH duplication, PSSCH) to occupy the channel. In other cases, the terminal device 110-1 may determine that the receiving/transmitting time is needed.

The terminal device 110-1 transmits 9030 a signal within the guard symbol in a sidelink transmission on a shared spectrum. In some embodiments, if the receiving/transmitting change time is needed, the terminal device 110-1 may perform a CCA (for example, a short time CCA) after the receiving/transmitting change time from the end of last PSSCH symbol (for example, the PSSCH symbol 1009). The terminal device 110-1 may transmit the signal (for example, the cyclic prefix extension of next symbol (for example, the AGC/PSFCH symbol 1011)) when CCA succeeds. For example, as shown in FIG. 10, within the guard symbol 1011, the terminal device 110-1 may perform the receiving/transmitting change in the duration 1011-1 and perform the CCA in the duration 1011-2. In this case, the terminal device 110-1 may transmit the signal in the duration 1011-3. In this way, it improves access ability.

Alternatively, the terminal device 110-1 can perform a CCA from the end of last PSSCH symbol (for example, the PSSCH symbol 1009) and transmit a signal before the receiving/transmitting change time. For example, as shown in FIG. 10, within the guard symbol 1011, the terminal device 110-1 may perform the CCA in the duration 1011-4 and may transmit the signal in the duration 1011-5. The terminal device 110-1 may perform the receiving/transmitting change in the duration 1011-6. In this way, it improves access ability.

Figure 11:
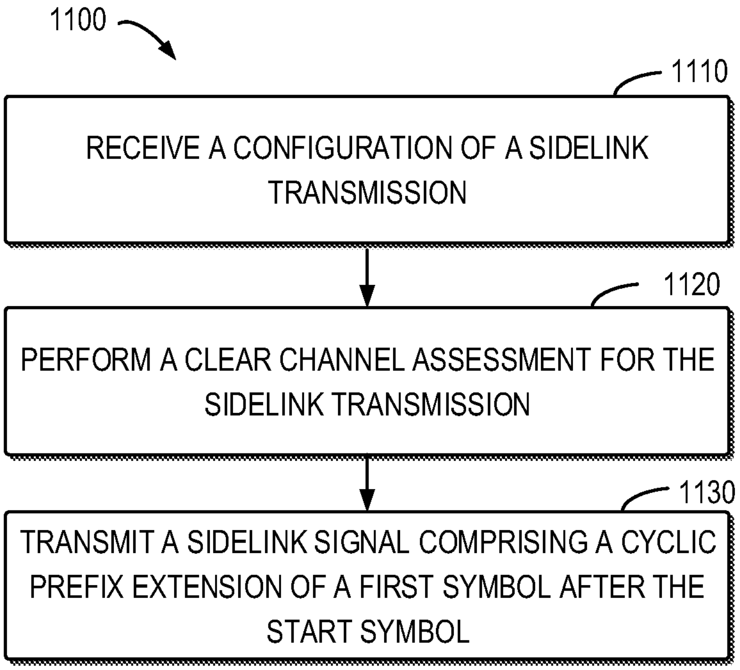
FIG. 11 is a flowchart of an example method in accordance with an embodiment of the present disclosure.

FIG. 11 shows a flowchart of an example method 1100 in accordance with an embodiment of the present disclosure. The method 1100 can be implemented at any suitable terminal devices. Only for the purpose of illustrations, the method 1100 can be implemented at the first terminal device 110-1 as shown in FIG. 1.

At block 1110, the terminal device 110-1 receives, from a network device 120, a configuration of a sidelink transmission. The configuration indicates a start symbol for the sidelink transmission.

At block 1120, the terminal device 110-1 performs a clear channel assessment (CCA) for the sidelink transmission. In some embodiments, if the completion of the CCA is within a set of symbols in one slot, the terminal device 110-1 can perform the CCA.

At block 1130, the terminal device 110-1 transmits, to the terminal device 110-2, a sidelink signal which comprises a cyclic prefix extension of a first symbol after the start symbol, if the CCA is successful.

In some embodiments, if the completion of the CCA is within the start symbol and remaining time in the start symbol is longer than a predetermined threshold, the terminal device 110-1 may transmit the sidelink signal after the completion of the CCA. The sidelink signal can comprise a portion of a first symbol after the start symbol. The first symbol may comprise physical sidelink control channel (PSCCH). In some embodiments, the portion of the first symbol can comprise a cyclic prefix extension of the first symbol, and the sidelink signal lacks an automatic gain control symbol.

Alternatively or in addition, if the completion of the CCA is within the start symbol and remaining time in the start symbol is shorter than a predetermined threshold, the terminal device 110-1 can determine that the CCA is failed.

In some embodiments, if the length between the completion of the CCA and the start symbol is one symbol, the terminal device 110-1 may transmit the sidelink signal after the completion of the CCA. The sidelink signal may comprise a cyclic prefix extension of an automatic gain control symbol.

In other embodiments, if the length between the completion of the CCA and the start symbol exceeds a predetermined number of symbols, the terminal device 110-1 may transmit the sidelink signal after the completion of the CCA. In this situation, the sidelink signal may comprise a cyclic prefix extension of an automatic gain control symbol and a duplication of the automatic gain control symbol.

Alternatively or in addition, the terminal device 110-1 may transmit the sidelink signal, in accordance with a determination that at least one of the is satisfied: the length is smaller than a threshold length, a priority of a traffic for the sidelink transmission is higher than a predetermined priority, the type of CCA is a predetermined CCA type, or an accumulating symbol counter is higher than a threshold number.

In some embodiments, the configuration further may indicate a plurality of candidate start symbols for the sidelink transmission. In other embodiments, a time window for the sidelink transmission can comprise one automatic gain control symbol.

Figure 12:
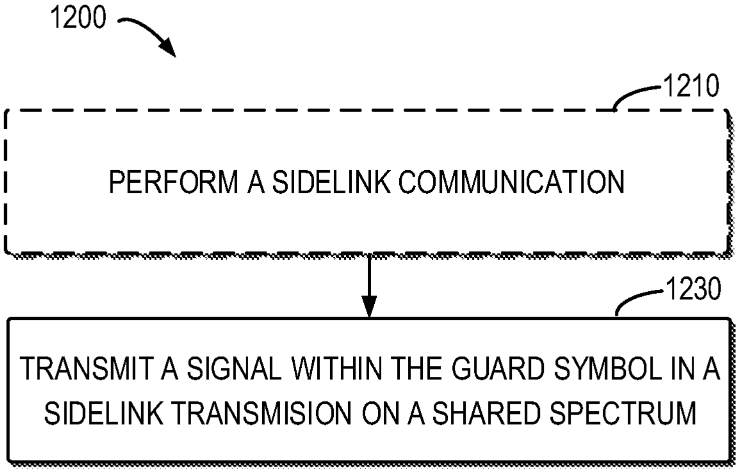
FIG. 12 is a flowchart of an example method in accordance with an embodiment of the present disclosure.

FIG. 12 shows a flowchart of an example method 1200 in accordance with an embodiment of the present disclosure. The method 1200 can be implemented at any suitable terminal devices. Only for the purpose of illustrations, the method 1200 can be implemented at the second terminal device 110-1 as shown in FIG. 1.

In some embodiments, at block 1210, the terminal device 110-1 performs a sidelink communication with the terminal device 110-2.

In some embodiments, the terminal device 110-1 determines whether receiving/transmitting change time is needed within a guard symbol in a sidelink slot based the sidelink communication. For example, the terminal device 110-1 may determine that the receiving/transmitting change time is not needed, in accordance with a determination that one of the followings is satisfied: a sidelink transmission is performed in a physical sidelink shared channel (PSSCH) symbol before the guard symbol while a sidelink reception in a physical sidelink feedback channel (PSFCH) symbol after the guard symbol is caused be skipped; or the sidelink transmission is performed in the PSSCH symbol and the PSFCH.

At block 1230, the terminal device 110-1 transmits, to the terminal device 110-2, a signal within a guard symbol in a sidelink transmission on a shared spectrum. In some embodiments, if the receiving/transmitting change time is needed, the terminal device 110-1 may perform a first type of clear channel assessment (CCA) after the receiving/transmitting change time. In this situation, if the CCA is successful, the terminal device 110-1 may transmit the signal.

In other embodiments if the receiving/transmitting change time is needed, the terminal device 110-1 may perform a first type of clear channel assessment (CCA) from an end of a physical sidelink shared channel (PSSCH) symbol preceding to the guard symbol. If the CCA is successful, the terminal device 110-1 may transmit the signal before the receiving/transmitting change time.

Alternatively, if the receiving/transmitting change time is needed, the terminal device 110-1 may perform a first type of clear channel assessment (CCA) from an end of a physical sidelink shared channel (PSSCH) symbol preceding to the guard symbol. The signal may comprise at least one of: a demodulation reference signal, a duplication of a physical sidelink feedback channel, or a physical sidelink shared channel.

In some embodiments, a terminal device comprises a circuitry configured to receive, at a first terminal device and from a network device, a configuration of a sidelink transmission, the configuration indicating a start symbol for the sidelink transmission; perform a clear channel assessment (CCA)) for the sidelink transmission; and in accordance with a determination that the CCA is successful, transmit, to a second terminal device, a sidelink signal comprising a cyclic prefix extension of a first symbol after the start symbol.

In some embodiments, the terminal device comprises a circuitry configured to transmit the sidelink signal by: transmitting the sidelink signal, in accordance with a determination that the completion of the CCA is within the start symbol and remaining time in the start symbol is longer than a predetermined threshold.

In some embodiments, the sidelink signal lacks a duplication of the first symbol.

In some embodiments, the terminal device comprises a circuitry configured to in accordance with a determination that the completion of the CCA is within the start symbol and remaining time in the start symbol is shorter than a predetermined threshold, determine that the CCA is failed.

In some embodiments, the terminal device comprises a circuitry configured to transmit the sidelink signal by: in accordance with a determination that the length between the completion of the CCA and the start symbol is one symbol, transmitting the sidelink signal after the completion of the CCA, the sidelink signal comprising a cyclic prefix extension of an automatic gain control symbol.

In some embodiments, the terminal device comprises a circuitry configured to in accordance with a determination that the gap between the completion of the CCA and the start symbol exceeds a predetermined number of symbols, transmit the sidelink signal after the completion of the CCA.

In some embodiments, the sidelink signal comprises a cyclic prefix extension of an duplication of the first symbol and a duplication of the duplication of the first symbol.

In some embodiments, the terminal device comprises a circuitry configured to transmit the sidelink signal by: transmitting the sidelink signal, in accordance with a determination that at least one of the is satisfied: the length is smaller than a threshold length, a priority of a traffic for the sidelink transmission is higher than a predetermined priority, the type of CCA is a predetermined CCA type, or an accumulating symbol counter is higher than a threshold number.

In some embodiments, the configuration further indicates a plurality of candidate start symbols for the sidelink transmission.

In some embodiments, the terminal device comprises a circuitry configured to perform the CCA by: in accordance with a determination that the completion of the CCA is within a set of symbols in one slot, performing the CCA.

In some embodiments, a time window for the sidelink transmission comprises one duplication of the first symbol.

In some embodiments, a terminal device comprises a circuitry configured to transmit, to the second terminal device, a signal within a guard symbol in a sidelink transmission on a shared spectrum.

In some embodiments, a terminal device comprises a circuitry configured to determine whether a receiving/transmitting change time is needed by: determining that the receiving/transmitting change time is not needed, in accordance with a determination that one of the followings is satisfied: a sidelink transmission is performed in a physical sidelink shared channel (PSSCH) symbol before the guard symbol while a sidelink reception in a physical sidelink feedback channel (PSFCH) symbol after the guard symbol is caused be skipped; or the sidelink transmission is performed in the PSSCH symbol and the PSFCH.

In some embodiments, a terminal device comprises a circuitry configured to in accordance with a determination that the receiving/transmitting change time is needed, perform a first type of clear channel assessment (CCA) from an end of a physical sidelink shared channel (PSSCH) symbol prior to the guard symbol.

In some embodiments, a terminal device comprises a circuitry configured to in accordance with a determination that a receiving/transmitting change time is needed, perform a first type of clear channel assessment (CCA) after the receiving/transmitting change time; and wherein transmitting the signal comprises: in accordance the CCA is successful, transmitting the signal.

In some embodiments, a terminal device comprises a circuitry configured to in accordance with a determination that a receiving/transmitting change time is needed, perform a first type of clear channel assessment (CCA) from an end of a physical sidelink shared channel (PSSCH) symbol preceding to the guard symbol; and wherein transmitting the signal comprises: in accordance the CCA is successful, transmitting the signal before the receiving/transmitting change time.

In some embodiments, the signal comprises at least one of: a demodulation reference signal, duplication of a physical sidelink feedback channel, or a physical sidelink shared channel.

Figure 13:
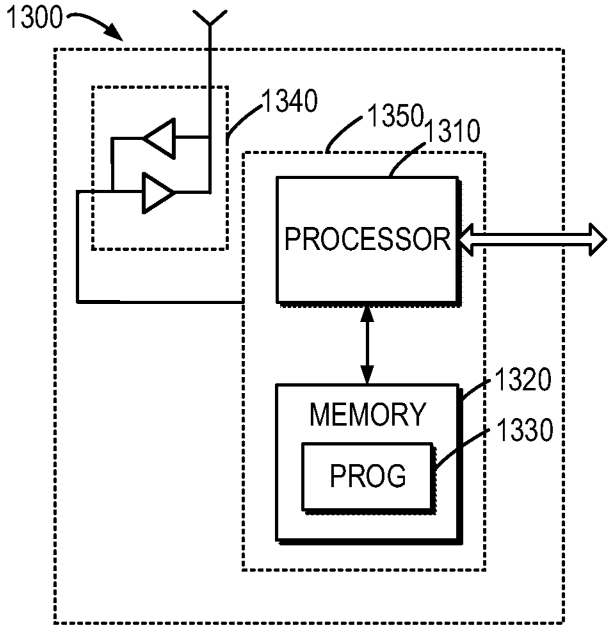
FIG. 13 is a simplified block diagram of a device that is suitable for implementing embodiments of the present disclosure.

FIG. 13 is a simplified block diagram of a device 1300 that is suitable for implementing embodiments of the present disclosure. The device 1300 can be considered as a further example implementation of the terminal device 110 and the network device 120 as shown in FIG. 1. Accordingly, the device 1300 can be implemented at or as at least a part of the terminal device 110 or the network device 120.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1320 stores at least a part of a program 1330. The TX/RX 1340 is for bidirectional communications. The TX/RX 1340 has at least one antenna to facilitate communication, though in practice an Access Node mentioned in this application may have several ones.

The communication interface may represent any interface that is necessary for communication with other network elements, such as X2 interface for bidirectional communications between eNBs, SI interface for communication between a Mobility Management Entity (MME)/Serving Gateway (S-GW) and the eNB, Un interface for communication between the eNB and a relay node (RN), or Uu interface for communication between the eNB and a terminal device.

The program 1330 is assumed to include program instructions that, when executed by the associated processor 1310, enable the device 1300 to operate in accordance with the embodiments of the present disclosure, as discussed herein with reference to FIGS. 2 to 12.

The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1320 may form processing means 1350 adapted to implement various embodiments of the present disclosure.

The memory 1320 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2-12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:

performing a channel access procedure to transmit a sidelink (SL) transmission on a channel;

after the channel is sensed to be available by using the channel access procedure, applying a cyclic prefix (CP) extension to a start symbol of the SL transmission within a first number of symbols before the start symbol; and applying a CP extension in a symbol between a first SL transmission and a second SL transmission following the first SL transmission, the first SL transmission and the second SL transmission being performed by the terminal device.

2. The method of claim 1, wherein the first number is 1.

3. The method of claim 1, further comprising:

receiving a configuration indicating two candidate start symbols for the SL transmission within a slot.

4. The method of claim 3, wherein the two candidate start symbols comprise a first candidate start symbol being symbol zero (0) and a second candidate start symbol being symbol seven (7).

5. A terminal device comprising a processor configured to cause the terminal device to:

perform a channel access procedure to transmit a sidelink (SL) transmission on a channel;

after the channel is sensed to be available by using the channel access procedure, apply a cyclic prefix (CP) extension to a start symbol of the SL transmission within a first number of symbols before the start symbol; and apply a CP extension in a symbol between a first SL transmission and a second SL transmission following the first SL transmission, the first SL transmission and the second SL transmission being performed by the terminal device.

6. The terminal device of claim 5, wherein the first number is 1.

7. The terminal device of claim 5, wherein the processor is further configured to cause the terminal device to:

receive a configuration indicating two candidate start symbols for the SL transmission within a slot.

8. The terminal device of claim 7, wherein the two candidate start symbols comprise a first candidate start symbol being symbol zero (0) and a second candidate start symbol being symbol seven (7).

* * * * *